United States Patent [19]

Nomura

[11] Patent Number: 4,478,315
[45] Date of Patent: Oct. 23, 1984

[54] APPARATUS FOR OPERATING AN AC POWER ELEVATOR

[75] Inventor: Masami Nomura, Nagoya, Japan

[73] Assignee: Mitsubishi Denki Kabushiki Kaisha, Tokyo, Japan

[21] Appl. No.: 440,350

[22] Filed: Nov. 9, 1982

[30] Foreign Application Priority Data

Nov. 16, 1981 [JP] Japan .................. 56-183208

[51] Int. Cl.³ .................................... B66B 5/02
[52] U.S. Cl. ................... 187/29 R; 340/19 R; 340/20
[58] Field of Search ................. 187/29, 29 R

[56] References Cited

U.S. PATENT DOCUMENTS

| | | | |
|---|---|---|---|
| 3,665,277 | 5/1972 | Velazguez | 187/29 R X |
| 3,917,029 | 11/1975 | Maynard | 187/29 R |
| 4,019,116 | 4/1977 | Klautschek | 318/807 X |
| 4,165,801 | 8/1979 | Watanabe et al. | 187/29 R |
| 4,209,082 | 6/1980 | Anzai et al. | 187/29 R |
| 4,235,309 | 11/1980 | Kuhl | 187/29 R |
| 4,319,177 | 3/1982 | Kawada et al. | 318/803 X |

FOREIGN PATENT DOCUMENTS

| | | | |
|---|---|---|---|
| 0007050 | 1/1978 | Japan | 187/29 R |
| 53-53855 | 5/1978 | Japan. | |
| 54-14631 | 11/1979 | Japan. | |

*Primary Examiner*—J. V. Truhc
*Assistant Examiner*—Paul S. L. Ip
*Attorney, Agent, or Firm*—Wenderoth, Lind & Ponack

[57] ABSTRACT

An apparatus for operating an AC powered elevator which connects an elevator controller to a capacitor for supplying DC power to an inverter when the AC power is interrupted while the cage of the elevator is running, thereby continuing to operate the elevator controller and the cage of the elevator to bring the cage to a floor and open the door of the cage to permit passengers within the cage to be evacuated. Circuitry is also provided to prevent damage to the inverter while supplying the AC power from the capacitor to the AC motor.

12 Claims, 6 Drawing Figures

APPARATUS FOR OPERATING AN AC POWER ELEVATOR

BACKGROUND OF THE INVENTION

The present invention relates to an improved apparatus for operating an AC elevator.

According to conventional apparatus of this type, an induction motor is used for driving a cage of the elevator, and AC power whose voltage and frequency may be varied, is supplied to the motor to operate the cage.

FIG. 1 is a diagram of an electric circuit of a conventional apparatus for operating an AC powered elevator, wherein terminals R, S and T are connected to a three-phase AC power source. A rectifier rectifies the output of the power source and a capacitor 2 smooths the DC output of the rectifier 1. An inverter 3 of the widely known PWM type is connected to the DC side of the rectifier 1 and controls the pulse width of a predetermined DC voltage to generate an AC power having a variable voltage and a variable frequency. A three-phase induction motor 4 is driven by the inverter 3. A brake wheel 5 is connected to the motor 4. A brake shoe 6 is provided oppositely to the outer periphery of the wheel 5 to provide brake force for the wheel 5 by the force of a spring (not shown). A brake coil 7 separates the shoe 6 from the wheel 5 against the force of the spring when the coil 7 is energized. A drive sheave 8 of a winch is driven by the motor 4. A main rope 9 is wound on the sheave. A cage 10 is coupled to the rope 9. A balancing weight 11 is similarly coupled. A power regenerative inverter 12 is connected between the power source at the terminals R, S and T, and the output side of the rectifier 1. The primary side of a transformer 13 is connected to the power source at the terminals R, S and T. A rectifier 14 is connected to the secondary side of the transformer 13. A start and stop device 15 is connected to the rectifier 14 and controls the starting and the stopping of the cage 10. Start and stop device 15 includes a brake controller 16 connected to and controlling the brake coil 7, a contactor controller 17, an operating electromagnetic contactor 18 which is controlled by the controller 17, and is energized when the cage 10 is started is deenergized when the cage 10 is stopped, and an operating electromagnetic contactor 19 which is similarly energized after the contactor 18 is energized and is deenergized when the contactor 18 is deenergized. Contacts 18a–18c of the electromagnetic contactor 18 are normally open. Contacts 19a–19c of the contactor 19 are also normally open. A speed controller 20 controls the inverters 3 and 12. A door controller 21 controls the opening and closing of the door of the cage provided at the cage 10.

The brake controller 16 may employ as the most simple structure the normally open contacts of the contactor 18. The contactor controller 17 may employ contacts which are closed by a start command and which are opened by a stop command, and the parallel circuit of the contacts and the contactors 18 and 19 may be connected in series with one another. Further, the door controller 21 may be constructed as shown in FIG. 2. In FIG. 2, reference character DF denotes the field coil of a door motor, and DM denotes a door motor. When contacts 51A and 51B are closed, the door motor DM is rotated toward the open side, and when the contacts 52A and 52B are closed, the motor DM is rotated toward the closed side. The door is controlled in this manner. The speed controller 20 is widely known, and speed control means may include, widely known voltage/frequency contant control, slip frequency control, vector control, etc., and the description thereof will therefore be omitted for the sake of brevity.

An apparatus for controlling a power elevator consists of the start and stop device 15, the speed controller 20, the door controller 21, etc.

The operation of the apparatus shown in FIG. 1 will be described.

The brake shoe 6 presses against the wheel 5 by the force of the spring during the stoppage of the cage 10. When a start command is dispatched to the cage 10, the contactor 18 is energized, the contacts 18a–18c are closed, and the rectifier 1 generates a DC output. The capacitor 2 is charged in this manner, and when the voltage across the capacitor 2 reaches a predetermined value, a control element (not shown) of the arms of the inverter 3 function in accordance with the operating direction thereof and generate AC power having a variable voltage and a variable frequency of the phase sequence corresponding to the operating direction. Then, the contactor 19 is energized, the contacts 19a–19c are closed, and the AC output of inverter 3 is supplied to the motor 4. Simultaneously, the brake coil 7 is energized. Accordingly, the brake shoe 6 is separated from the wheel 5. In this manner, the motor 4 starts in a direction determined by the phase sequence of the input, and the cage 10 starts running. The output frequency of the inverter 3 is regulated in accordance with a speed command signal by the operation of the speed controller 20, and the speed of the motor 4 and hence the running speed of the cage 10 is thereby controlled.

When the cage 10 is descending with a heavy load, or is ascending with an adjusted load, the difference in weight between the cage 10 and the balancing weight 11 is descending, which is called "a descending load operation". More particularly, the descending load operation means the downward operation of heavier one of the cage and the weight hung via the rope of the elevator. During this descending load operation, the motor 4 generates regenerative electric power. This regenerative electric power is sent through the inverter 3 back to the DC side, and is further sent through the inverter 12 back to the power source at the terminals R, S and T.

When the power source at the terminals R, S and T is interrupted while the cage 10 is running, the contactors 18, 19 are deenergized, and the contacts 18a–18c and 19a–19c are opened. Simultaneously, the brake coil 7 is deenergized. Accordingly, the brake shoe 6 is pressed against the wheel 5 by the force of the spring, a braking force is actuated on the wheel 5, and the case 10 is abruptly stopped. At this time the cage 10 is not likely to be in a zone where the door controller 21 is not capable of opening the door, resulting in the door being impossible to open, and passengers riding on the cage 10 are disadvantageously enclosed in the cage 10.

SUMMARY OF THE INVENTION

The present invention enables the avoidance of the above-mentioned drawbacks and its object is to provide an apparatus for operating an AC powered elevator, which connects the cage of the elevator to a capacitor for supplying AC power to an inverter, thereby actuating the elevator controller from energy stored in the capacitor to operate the cage so as not to enclose passengers in the cage when the usual AC powers source is interrupted.

Another object of the present invention is to provide an apparatus for operating an AC powered elevator, which can prevent damage to an inverter which supplies AC power to an AC motor.

In order to achieve the above and other objects, there is provided according to the present invention an apparatus for operating an AC powered elevator comprising: a rectifier the input of which connects to a commercial AC power source for rectifying the output of the AC power source into a DC voltage; a capacitor which connects to the output side of the rectifier for smoothing the output of the rectifier; an inverter which connects to the capacitor for converting the DC output smoothed by the capacitor into AC power having a variable frequency; an AC motor driven by the AC power of the inverter for actuating the cage of the elevator; an elevator control means having a start and stop device which connects to the commercial AC power source for controlling the starting and the stopping of the cage of the elevator and a speed controlling means for producing a speed command signal for controlling the opening and the closing of the inverter; a power interruption detecting circuit for detecting the interruption of the commercial AC power source; and an emergency operating circuit which connects to the capacitor and the elevator controller by the operation of the power interruption detecting circuit for driving the elevator controlling means from the electric energy stored in the capacitor.

BRIEF DESCRIPTION OF THE DRAWINGS

In the drawings, the same reference numerals designate the same or equivalent parts and components.

DESCRIPTION OF THE PREFERRED EMBODIMENTS

An embodiment of the invention will be described below in conjunction in FIGS. 3 to 6.

Figure 3:
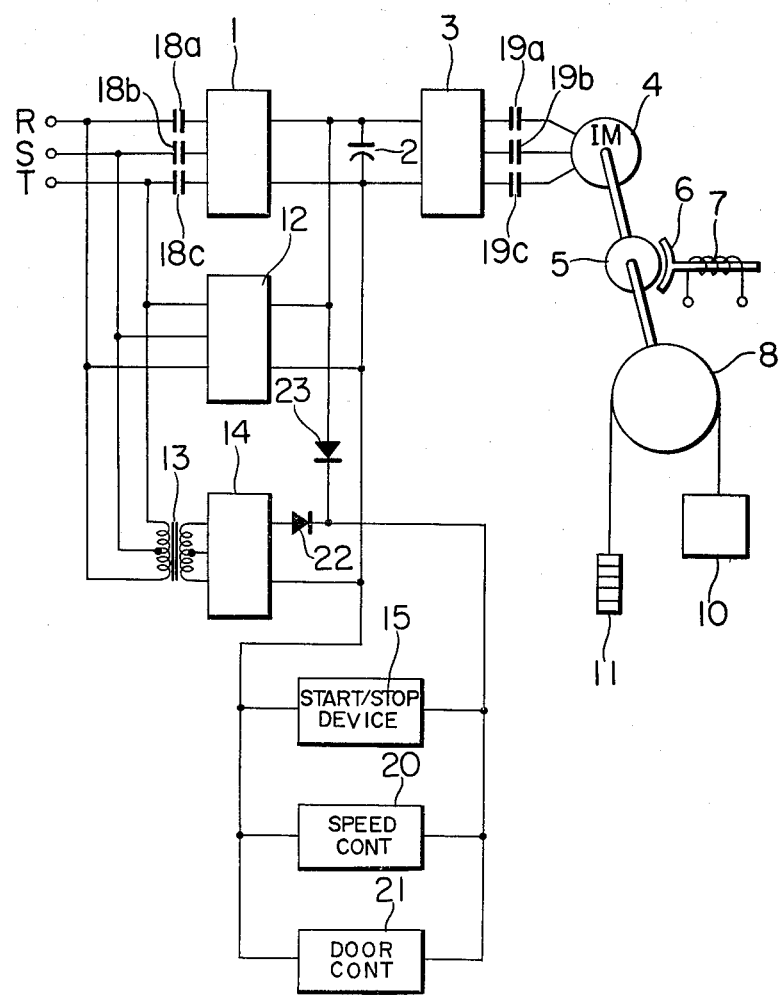
FIG. 3 is a electro-mechanical circuit diagram illustrating the construction of an apparatus for operating an AC powered elevator according to an embodiment of the present invention.

In FIG. 3, a diode 22 is inserted in a line which connects the output side of the rectifier 14 to the controllers 15, 20 and 21. A diode 23 is inserted in a line which connects one end of the capacitor 2 to the output side of the diode 22. The diodes 22 and 23 operate as both a power interruption detecting circuit and an emergency operating circuit. Other elements of FIG. 3 are the same as those of FIG. 1.

Figure 1:
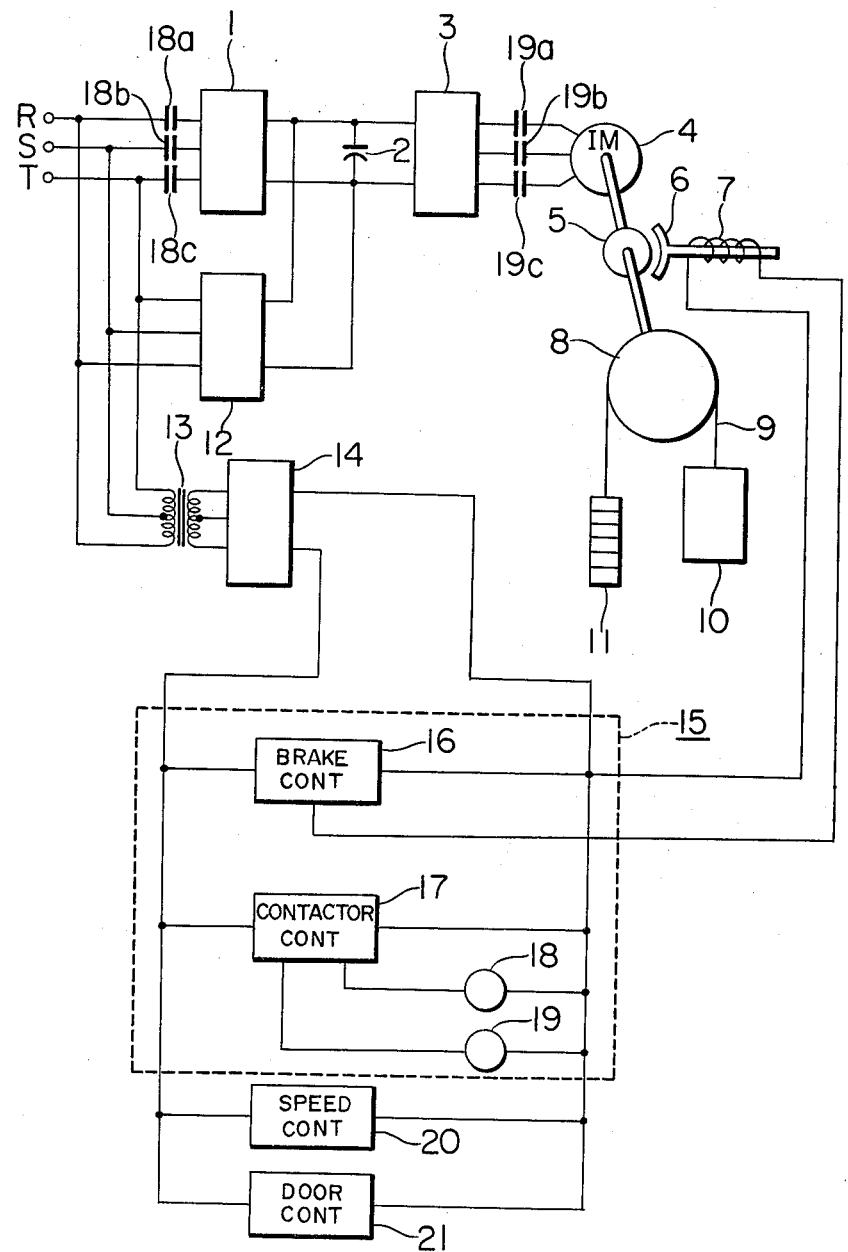
FIG. 1 is an electro-mechanical circuit diagram showing the construction of a conventional apparatus for controlling an AC powered elevator.
Figure 2:
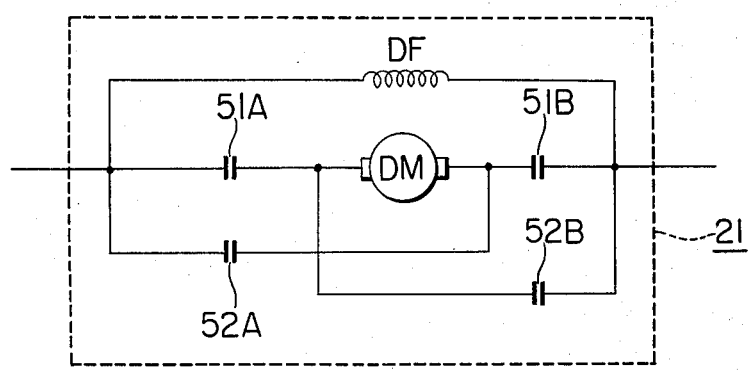
FIG. 2 is a circuit diagram illustrating the construction of a door controller.

When the AC power source at the terminals R, S and T is normal, the DC power of the respective controllers 15, 20 and 21 is supplied through the diode 22 from the rectifier 14 in the same manner as that in FIG. 1.

When the AC power source at the terminals R, S and T is interrupted during the running of the cage 10, the capacitor 2 is connected through the diode 23 to the respective controllers 15, 20 and 21, and the electric power stored in the capacitor 2 is supplied to the respective controllers 15, 20 and 21. In this manner, the cage 10 does not immediately abruptly stop, but can continue running and can stop in the door openable zone in the nearest floor. Particularly, in the case where the regenerative electric power of the motor 4 is directed back through the inverter 3 to the DC side as in the descending load operation, that electric power is added to the stored electric energy in the capacitor. Therefore, the cage 10 can be effectively run to the nearest floor or to the floor to be called for. After the cage 10 stops at a particular floor, the regenerative electric power is lost, but since the electric power for opening the door is not considerable, the door can be sufficiently opened by the electric energy stored in the capacitor 2 that the passengers in the cage 10 can be evacutated.

Figure 4:
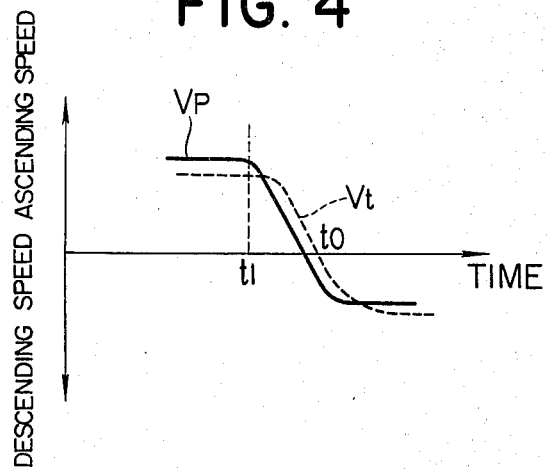
FIG. 4 is a graphical representation of the operating speed during an ascending load operation of the embodiment shown in FIG. 3.

FIG. 4 shows the operation of the ascending load operation of the embodiment shown in FIG. 3.

In FIG. 4, reference character $V_p$ denotes a speed command signal, and $V_t$ denotes an actual speed.

Assume now that the cage 10 is ascending with a heavy load. When the power is interrupted at time $t_1$, the speed controller 20 immediately lowers the speed command signal $V_p$. Since the signal $V_p$ is set to the synchronizing speed of the motor 4, it causes regenerative braking in the range that the actual speed $V_t$ exceeds the speed command signal $V_p$. Therefore, the cage 10 is regeneratively braked after the power is interrupted, and is stopped at the time $t_0$. Subsequently, the signal $V_p$ is set to the downward direction, the running direction of the cage 10 is inverted toward the downward running direction, thereby starting the descending load operation. Thus, as described with reference to FIG. 3, the regenerative operation is achieved, and the cage 10 is stopped at the nearest floor and the door is opened at the floor by utilizing the regenerative electric power.

Figure 5:
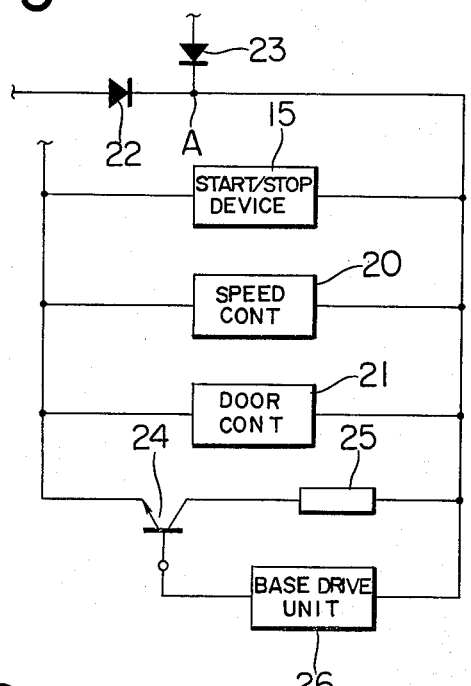
FIG. 5 is a circuit diagram illustrating part of another embodiment according to the present invention.

FIG. 5 illustrates a part of the construction of another embodiment of the present invention.

Figure 6:
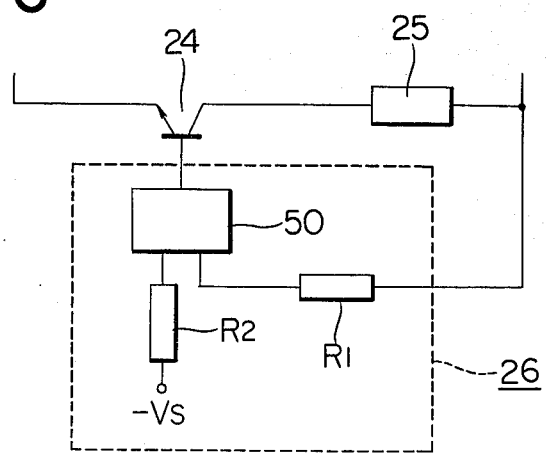
FIG. 6 is a circuit diagram illustrating a base drive unit.

In FIG. 5, the emitter of a transistor 24 is connected to one of the output sides of the rectifier 14, and the collector of the transistor 24 is connected through a resistor 25 to the diodes 22 and 23. A base drive unit 26 is connected to a line which connects the base of the transistor 24 to between the diodes 22 and 23 for applying a voltage to the base of the transistor 24. A regenerative electric power regulating circuit is composed of the transistor 24, the resistor 25 and the base drive unit 26. The base drive unit 26 is constructed as shown in FIG. 6. When the regenerative output reaches a predetermined value, a comparator 50 operates and switches the transistor 24. The comparator 50 may preferably have hysteresis characteristics. In the embodiment of FIG. 6, $R_1$ and $R_2$ denote resistors. In FIG. 5, other elements are the same as those of FIG. 3.

In the case where the regenerative electric power is larger than that which is consumed by the respective controllers 15, 20 and 21 since the inverter 12 does not operate at the power interruption time, the terminal voltage of the capacitor 2 will rise. In the embodiment of FIGS. 1 and 3, it is possible that the terminal voltage may exceed the voltage of the inverter 3, resulting in damage to the inverter. The embodiment of FIGS. 5 and 6 prevents this damage to the inverter.

More particularly, when the terminal voltage of the capacitor 2 rises, the potential at the output side A of the diodes 22 and 23 will rise. When this potential exceed a predetermined value, the base drive unit 26 will operate and the transistor 24 will conduct. Therefore, a current will flow through the resistor 25, and the regenerative electric power will be consumed through the resistor 25. When the terminal voltage of the capacitor 2 is lowered, the transistor 24 is again interrupted, and the potential at the output sides A of the diodes 22 and 23 is again maintained at a predetermined value. Therefore, damage to the inverter 3 can be avoided.

When the terminal voltage of the capacitor 2 rises in response to excessive regenerative electric power, the phase rotation of the output of the inverter 3 is halted to brake the motor 4 in a direct current manner to stop temporarily the electric power regeneration, and the excessive electric power may be consumed in the coil of the motor 4. Moreover, the slip of the motor 4 is controlled during the time of regenerative operation, and the regenerative electric power may be suppressed to the minimum value as required.

In the embodiment described above, the DC power is supplied from the DC side of the inverter 3 to the respective controllers 15, 20 and 21 only at the time of power interruption. However, the DC power may be supplied always from the DC side.

The respective controllers 15, 20 and 21 may also be connected to the capacitor 2 by employing a power interruption detecting relay instead of the diodes 22 and 23.

According to the present invention, as mentioned above, the controllers are connected to the capacitor which supplies the DC power to the inverter when the AC power is interrupted. Therefore, the cage is not stopped at the time of power interruption but continues to run and is stopped at the nearest floor so that the enclosure of passengers in the cage can be avoided as much as possible.

What is claimed is:

1. An apparatus for operating an AC powered elevator, comprising:
    a rectifier the input of which is connectable to an external AC power source for rectifying the output of the AC power source into a DC voltage;
    a capacitor connected to the output side of said rectifier for smoothing the output of said rectifier;
    an inverter connected to said capacitor for converting the DC output smoothed by said capacitor into AC power having a variable frequecy;
    an AC motor driven by the AC power output of said inverter for actuating the cage of the elevator;
    an elevator control means having a start and stop device which is connectable to the external AC power source for controlling the starting and the stopping of the cage of the elevator and a speed controller for producing a speed command signal for controlling the enablement and the disablement of said inverter;
    a power interruption detecting circuit for detecting the interruption of the external AC power source; and
    an emergency operating circuit connected to said capacitor and said elevator control means by the operation of said power interruption detecting circuit for driving said elevator control means by the electric power of said capacitor.

2. An apparatus for operating an AC powered elevator as set forth in claim 1, wherein said start and stop device comprises:
    a first electromagnetic connector for opening and closing the connection between the external AC power source and said rectifier,
    a second electromagnetic contactor for opening and closing the connection between said capacitor and said AC motor, and
    a contactor controller for energizing said first contactor when the cage is started and deenergizing said first contactor when the cage is stopped, and for energizing said second contactor after said first contactor is energized and deenergizing said second contactor after said first contactor is deenergized.

3. An apparatus for operating an AC powered elevator as set forth in claim 2, wherein said AC motor has a brake wheel, said apparatus further comprising a brake shoe having a brake coil, facing said brake wheel, said start and stop device comprising a brake controller for controlling the energization of said brake coil.

4. An apparatus for operating an AC powered elevator as set forth in claim 3, wherein said first and second electromagnetic contactors further comprise contacts which are closed in response to a start command and are opened in response to a stop command directed from said contactor controller to said first and second contactors.

5. An apparatus for operating an AC powered elevator as set forth in claim 4, wherein said brake controller comprises a normally open contact of said first contactor, said brake coil being energized so as to separate said brake shoe from said brake wheel when a contact of said first contactor is closed.

6. An apparatus for operating an AC powered elevator as set forth in claim 1, wherein said elevator controller comprises a door controller which controls the opening and the closing of a door provided in the cage of said elevator.

7. An apparatus for operating an AC powered elevator as set forth in claim 1, wherein an electric power regenerating inverter is contected between the external AC power source and the output side of said rectifier.

8. An apparatus for operating an AC powered elevator as set forth in claim 7, wherein said power interruption detecting circuit and said emergency operating circuit comprise diodes.

9. An apparatus for operating an AC powered elevator as set forth in claim 8, wherein said diodes comprise a first diode which is connected between said rectifier and said elevator control means, and second diode which is connected between one end of said capacitor and the output side of said first diode.

10. An apparatus for operating an AC powered elevator as set forth in claim 7, wherein said power interruption detecting circuit is composed of a power interruption detecting relay.

11. An apparatus for operating an AC powered elevator, comprising:
    a first rectifier the input of which is connectable to an external AC power source for rectifying the output of the AC power source into a DC voltage;
    a capacitor connected to the output side of said first rectifier for smoothing the output of said first rectifier;

an inverter connected to said capacitor for converting the DC output smoothed by said capacitor into AC power having a variable frequency;

an AC motor driven by the AC power output of said inverter for actuating the cage of the elevator;

a transformer for connection to the AC power source;

a second rectifier the input of which is connectable to the external AC power source through said transformer for rectifying the output of the AC power source into a DC voltage;

an elevator controller including, in parallel, a start and stop circuit which is connectable to the output of said second rectifier for controlling the starting and the stopping of the cage of the elevator, a speed controller circuit for producing a speed command signal for controlling the enablement and the disablement of said inverter and a door controller circuit for controlling the opening and the closing of a door of the cage of the elevator;

an electric power regeneration inverter for connecting its input to the external AC power source and having its output connected to the output side of said first rectifier;

means, including a power interruption detecting circuit, for detecting the interruption of the external AC power source; and an emergency operating circuit which electrically connects said capacitor to said elevator controller in response to the operation of said power interruption detecting circuit, whereby said elevator controller is driven from electric power stored in said capacitor.

12. An apparatus for operating an AC powered elevator, comprising:

a first rectifier the input of which is connectable to an external AC power source for rectifying the output of the AC power source into a DC voltage;

a capacitor connected to the output side of said first rectifier for smoothing the output of said first rectifier;

an inverter connected to said capacitor for converting the DC output smoothed by said capacitor into AC power having a variable frequency;

an AC motor driven by the AC power output of said inverter for actuating the cage of the elevator;

a transformer connectable to the AC power source;

a second rectifier the input of which connects to the external AC power source through said transformer for rectifying the output of the AC power source into a DC voltage;

an elevator controller including, in parallel, a start and stop circuit which is connectable to the output of said second rectifier for controlling the starting and stopping of the cage of the elevator, a speed controller circuit for producing a speed command signal for controlling the enablement and the disablement of said inverter, a door controller circuit for controlling the opening and the closing of a door of the cage of the elevator, and a regenerative electric power regulating circuit including a transistor, a resistor in series with said transistor, and a base drive circuit of said transistor;

an electric power regeneration inverter having its input connectable to the external AC power source and having its output connected to the output side of said first rectifier;

means, including a power interruption detecting circuit, for detecting the interruption of the external AC power source; and an emergency operating circuit which electrically connects said capacitor to said elevator controller by the operation of said power interruption detecting circuit, whereby said elevator controller is driven from electric power stored in said capacitor.

* * * * *